(12) United States Patent
Amte et al.

(10) Patent No.: US 10,166,502 B2
(45) Date of Patent: Jan. 1, 2019

(54) SINGLE COMPRESSION SYSTEM AND PROCESS FOR CAPTURING CARBON DIOXIDE

(71) Applicant: Reliance Industries Limited, Maharashtra (IN)

(72) Inventors: Vinay Amte, Chhattisgarh (IN); Asit Kumar Das, Gujarat (IN); Surajit Sengupta, West Bengal (IN); Manoj Yadav, Haryana (IN); Sukumar Mandal, Haryana (IN); Alok Pal, Uttar Pradesh (IN); Ajay Gupta, Haryana (IN); Ramesh Bhujade, Maharashtra (IN); Satyanarayana Reddy Akuri, Andhra Pradesh (IN); Rajeshwer Dongara, Maharashtra (IN)

(73) Assignee: RELIANCE INDUSTRIES LIMITED, Mumbai, Maharashtra (IN)

( * ) Notice: Subject to any disclaimer, the term of this patent is extended or adjusted under 35 U.S.C. 154(b) by 476 days.

(21) Appl. No.: 15/027,345

(22) PCT Filed: Sep. 29, 2014

(86) PCT No.: PCT/IN2014/000628
§ 371 (c)(1),
(2) Date: Apr. 5, 2016

(87) PCT Pub. No.: WO2015/052726
PCT Pub. Date: Apr. 16, 2015

(65) Prior Publication Data
US 2016/0250582 A1    Sep. 1, 2016

(30) Foreign Application Priority Data
Oct. 9, 2013 (IN) .......... 3190/MUM/2013

(51) Int. Cl.
*B01D 45/16* (2006.01)
*B01D 53/04* (2006.01)
(Continued)

(52) U.S. Cl.
CPC ......... *B01D 53/0462* (2013.01); *B01D 45/16* (2013.01); *B01D 53/10* (2013.01);
(Continued)

(58) Field of Classification Search
CPC .......... B01D 2251/30; B01D 2251/606; B01D 2252/204; B01D 2253/112;
(Continued)

(56) References Cited

U.S. PATENT DOCUMENTS 1,577,534 A * 3/1926 Miller .................... B01D 53/08
                                                    261/DIG. 34
2,492,401 A * 12/1949 Schutte .................. B01D 53/08
                                                    95/104
(Continued)

FOREIGN PATENT DOCUMENTS

| CN | 102500191 A | 6/2012 |
|---|---|---|
| EP | 2 638 949 A1 | 9/2013 |
| WO | 2012/083108 A2 | 6/2012 |

OTHER PUBLICATIONS

International Search Report and Written Opinion for International Application No. PCT/IN2014/000628, dated Feb. 10, 2015, 8 pages.
(Continued)

*Primary Examiner* — Cabrena Holecek
(74) *Attorney, Agent, or Firm* — Westman, Champlin & Koehler, P.A.

(57) ABSTRACT

The present disclosure provides a single compression system and a process for capturing carbon dioxide ($CO_2$) from a flue
(Continued)

gas stream containing $CO_2$. The disclosure also provides a process for regeneration of the carbon dioxide capture media.

20 Claims, 1 Drawing Sheet

(51) Int. Cl.
*B01J 20/04* (2006.01)
*B01J 20/08* (2006.01)
*B01J 20/34* (2006.01)
*B01D 53/10* (2006.01)
*B01D 53/02* (2006.01)

(52) U.S. Cl.
CPC .......... *B01J 20/041* (2013.01); *B01J 20/043* (2013.01); *B01J 20/08* (2013.01); *B01J 20/3433* (2013.01); *B01J 20/3483* (2013.01); *B01D 53/02* (2013.01); *B01D 2251/30* (2013.01); *B01D 2251/606* (2013.01); *B01D 2252/204* (2013.01); *B01D 2253/112* (2013.01); *B01D 2253/1124* (2013.01); *B01D 2253/20* (2013.01); *B01D 2257/504* (2013.01); *B01D 2258/0283* (2013.01); *B01D 2259/40092* (2013.01); *Y02C 10/04* (2013.01); *Y02C 10/08* (2013.01)

(58) Field of Classification Search
CPC ........ B01D 2253/1124; B01D 2253/20; B01D 2257/504; B01D 2258/0283; B01D 2259/40092; B01D 45/16; B01D 53/02; B01D 53/0462; B01D 53/10; B01J 20/041; B01J 20/043; B01J 20/08; B01J 20/3433; B01J 20/3483; Y02C 10/04; Y02C 10/08
See application file for complete search history.

(56) References Cited

U.S. PATENT DOCUMENTS

| | | | | |
|---|---|---|---|---|
| 2,583,239 A | * | 1/1952 | Watson | C01B 32/40 502/400 |
| 2,652,437 A | * | 9/1953 | Marwil | C10G 25/08 208/310 R |
| 2,702,826 A | * | 2/1955 | Etherington | B01D 15/185 210/648 |
| 2,723,300 A | * | 11/1955 | Lewis, Jr. | C07C 4/04 585/539 |
| 3,485,014 A | * | 12/1969 | Nishimoto | B01D 53/50 55/474 |
| 5,304,234 A | * | 4/1994 | Takatsuka | B01D 53/047 95/106 |
| 5,336,300 A | * | 8/1994 | Yoshino | B01D 53/08 95/106 |
| 5,496,395 A | * | 3/1996 | Yamazaki | B01D 53/12 55/356 |
| 5,676,738 A | * | 10/1997 | Cioffi | B01D 53/08 95/109 |
| 5,917,136 A | | 6/1999 | Gaffney et al. | |
| 6,251,164 B1 | * | 6/2001 | Notaro | B01D 53/10 95/106 |
| 6,387,337 B1 | * | 5/2002 | Pennline | B01D 53/08 422/216 |
| 7,731,782 B2 | | 6/2010 | Kelley et al. | |
| 7,947,120 B2 | | 5/2011 | Deckman et al. | |
| 8,500,855 B2 | * | 8/2013 | Eisenberger | B01D 53/04 95/139 |
| 8,753,437 B2 | * | 6/2014 | Yi | B01D 53/10 96/150 |
| 8,753,535 B2 | * | 6/2014 | Kumar | C08F 6/02 252/184 |
| 8,852,329 B2 | * | 10/2014 | Yi | B01D 53/12 96/134 |
| 8,975,464 B2 | * | 3/2015 | Jamal | B01D 53/04 585/824 |
| 9,278,314 B2 | * | 3/2016 | Krutka | B01D 53/62 |
| 9,352,270 B2 | * | 5/2016 | Krutka | B01D 53/12 |
| 2007/0283812 A1 | * | 12/2007 | Liu | B01D 53/08 96/150 |
| 2010/0172810 A1 | * | 7/2010 | Yi | B01D 53/10 422/292 |
| 2011/0088553 A1 | * | 4/2011 | Woodhouse | B01D 53/1425 95/162 |
| 2011/0088557 A1 | * | 4/2011 | Yi | B01D 53/12 96/144 |
| 2016/0236137 A1 | * | 8/2016 | Amte | B01D 53/62 |
| 2018/0169574 A1 | * | 6/2018 | Sengupta | B01D 53/62 |

OTHER PUBLICATIONS

Jana, Kuntal et al., "Energy Savings Potential Through Waste Heat Recovery From Flue Gas for Post Combustion CO2 Capture", International Journal of Emerging Technology and Advanced Engineering, vol. 3, Special Issue 3: ICERTSD 2013, pp. 435-442, An ISO 9001:2008 certified Int. Journal, ISSN 2250-2459, available online at www.ijetae.com.

* cited by examiner

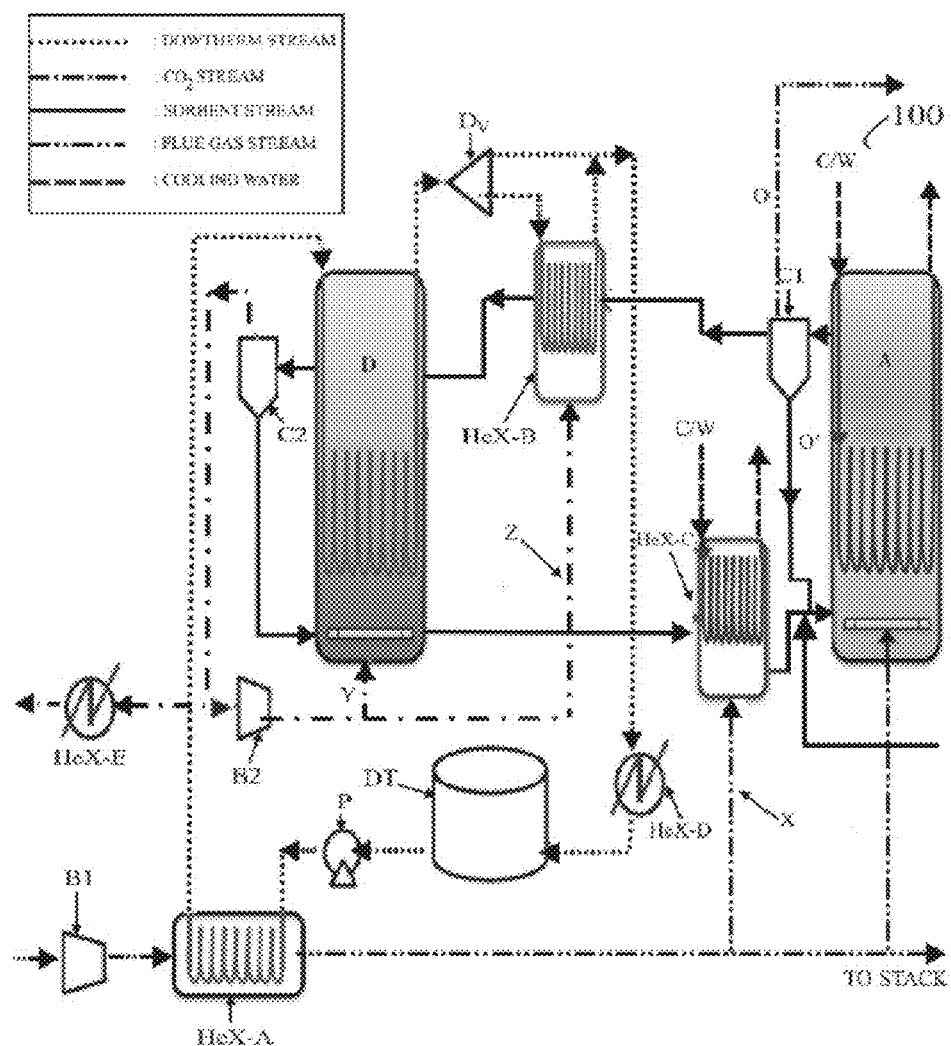

SINGLE COMPRESSION SYSTEM AND PROCESS FOR CAPTURING CARBON DIOXIDE

CROSS-REFERENCE TO RELATED APPLICATION

This Application is a Section 371 National Stage Application of International Application No. PCT/IN2014/000628, filed 29 Sep. 2014 and published as WO 2015/052726 A1 on 16 Apr. 2015, in English, the contents of which are hereby incorporated by reference in their entirety.

FIELD

The present disclosure relates to a system and process for capturing carbon dioxide from flue gas using carbon dioxide capture media.

BACKGROUND

Flue gases originating from oil refineries, fossil fuel based power plants, cement plants contain hazardous gaseous pollutants such as sulfur dioxide ($SO_2$), sulfur trioxide ($SO_3$), hydrogen sulfide ($H_2S$), hydrogen chloride (HCl), hydrogen fluoride (HF), nitrogen oxides and carbon dioxide ($CO_2$) that have some severe adverse short-term as well as long-term effects on human health and the environment. Different strategies have therefore been devised for reducing the amount of the afore-stated pollutants from flue gases before they are released into the atmosphere.

The amount of $CO_2$ present in flue gas can be reduced by methods such as burning less coal, improving the efficiency of coal-fired power plants and capturing, followed by storing the captured $CO_2$. Among the various $CO_2$ capture techniques such as pre-combustion, post-combustion and oxy-combustion, post-combustion is the most promising technique since it does not require any extensive rebuilding of the existing process plant.

Absorption technique such as wet scrubbing amine absorption, is another conventional technique for carbon dioxide capture. However, the absorption techniques are associated with several drawbacks such as (i) limitation in the rate of absorption of $CO_2$ due to diffusional resistance through the liquid phase; (ii) high energy requirement for amine regeneration (2.5-4.0 GJ/ton $CO_2$); (iii) oxidative degradation and acidification of solvent due to the presence of oxygen in the flue gas thereby making it corrosive in addition to causing loss in the available alkalinity for carbon dioxide capture; (iv) loss of amine due to its appreciable volatility results in equilibrium losses of amine to the treated gas; and (v) thermal degradation of amine rendering it unsuitable for continued use and hence, the requirement for substantial amounts of fresh make-up amine. Further, it is observed that the amine absorption process is restricted to carbon dioxide capture at ambient temperatures. Furthermore, capturing carbon dioxide using the absorption technique requires energy in the form of electricity or steam or both, that is supplied by process plants like power plants which reduces the overall efficiency of the power plant by up to 13%.

Therefore, there is an increased interest in developing less expensive and/or energy integrated processes for capturing carbon dioxide. The adsorption processes, generally employing solid adsorptive material that fall under the post combustion category, serve as an alternative to the absorption based process. This is because replacing water by solid support greatly reduces the energy required for carbon dioxide capture due to the lower heat capacity of solid supports as compared to water. Published literature on carbon dioxide capture by the adsorption technique shows considerable $CO_2$ capture capacity. However, the high temperature and resource requirements for the regeneration of the capture media influence the overall cost and time efficiency of the process.

U.S. Pat. Nos. 7,731,782 and 7,947,120 disclose adsorption processes that employ zeolite for carbon dioxide capture and utilize the heat of compression of the resulting carbon dioxide rich stream in the desorption step. Here, the carbon dioxide rich stream is compressed after the adsorption-desorption step and the heat generated is used for matching the heat demand, resulting in significant requirement of energy to carry out the process.

WO 2012083108 discloses sodium carbonate enriched sorbent based adsorption process for carbon dioxide capture. The method utilizes the exothermic heat from the adsorber via heat exchange with LPG or propane as the working fluid for production of power. This requirement of additional LPG or propane adds to the costs and inventory.

U.S. Pat. No. 5,917,136 discloses a pressure swing adsorption process for carbon dioxide capture that uses modified alumina adsorbents. The modified adsorbents have carbon dioxide sorption capacities of about 0.11-0.29 mmoles/g, however, they are of expensive nature.

Most of the processes for capturing carbon dioxide from air or flue gas stream utilize heat from an external source together with the heat made available by compressing the desorbed vapor product (pure carbon dioxide). However, this type of heat utilization does not significantly improve the cost-efficiency of the process.

A need is, therefore, felt for developing a simple, energy efficient and economic process as well as system for the removal of carbon dioxide present in flue gases that overcomes the drawbacks associated with the prior art.

OBJECTS

Some of the objects of the present disclosure, which at least one embodiment is able to achieve, are discussed herein below.

It is an object of the present disclosure to provide a single compression process for capturing carbon dioxide using a capture media.

It is another object of the present disclosure to provide a cost-efficient and environment friendly process for capturing carbon dioxide using a capture media.

It is still another object of the present disclosure to provide a single compression system for capturing carbon dioxide using a capture media.

It is yet another object of the present disclosure to provide a cost-efficient and environment friendly system for the regeneration of the carbon dioxide capture media.

It is still another object of the present disclosure to ameliorate one or more problems of the prior art or to at least provide a useful alternative.

Other objects and advantages of the present disclosure will be apparent from the following description and accompanying drawing which is not intended to limit the scope of the present disclosure.

SUMMARY

The present disclosure provides a single compression process for capturing carbon dioxide ($CO_2$) from a flue gas stream containing $CO_2$; said process comprising the following steps:

i. directing the flow of the flue gas stream through a first blower (B1) to obtain a pressurized flue gas stream with elevated temperature;
ii. extracting the heat from the pressurized flue gas stream in a first heat exchanger (Hex-A) using circulating thermic fluid to obtain a heated thermic fluid and a cooled pressurized flue gas stream;
iii. directing the cooled pressurized flue gas stream to a $CO_2$ adsorber (A);
iv. passing in the adsorber (A) a fluidized lean $CO_2$ capture media to generate a stream comprising rich capture media and flue gas devoid of $CO_2$;
v. separating in a first cyclone (C) said rich capture media and said stream of flue gas devoid of $CO_2$;
vi. directing the separated stream of flue gas devoid of $CO_2$ to a stack for further treatment;
vii. leading said separated rich capture media to a second heat exchanger (Hex-B) where it is heated to near regeneration temperature, at least partially, using said heated thermic fluid to obtain a heated rich capture media;
viii. feeding said heated rich capture media to a desorber (D);
ix. heating the heated rich capture media in the desorber (D) by circulating said heated thermic fluid to desorb $CO_2$ from the heated rich capture media to generate a mixture of hot lean capture media and $CO_2$ gas;
x. separating $CO_2$ gas from the hot lean capture media; and
xi. cooling the separated hot and lean capture media in a third heat exchanger (Hex-C) for adsorption in the adsorber (A) for reiteration of the process.

A portion of the cooled pressurized flue gas stream (X) can be used for fluidizing said separated capture media in the third heat exchanger (Hex-C).

The temperature of the adsorber (A) can be controlled with the help of external cold water (C/W) circulating through the adsorber (A) during the process of adsorption of the $CO_2$ on the cool and lean capture media. The adsorption reaction in the adsorber (A), takes place efficiently at a temperature ranging from 50-70° C.

The capture media can be at least one selected from the group consisting of supported alkali metal carbonate, supported alkali metal oxide and supported amine.

The rich capture media emerging from the adsorber (A) after separation from the flue gas stream devoid of $CO_2$ can be recycled, as stream (O'), via the first cyclone (C1) to the adsorber (A).

In the second heat exchanger (Hex-B), said rich capture media is heated by a circulating thermic fluid leaving the desorber (D) to obtain a warm thermic fluid leaving the second heat exchanger (Hex-B).

The adsorber (A) and said desorber (D) are circulating interconnected fluidized bed reactors operating in at least one regime selected from the group consisting of dense, bubbling, entrained, turbulent and fast fluidization.

The warm thermic fluid leaving the second heat exchanger (Hex-B) can be cooled before storing in a thermic fluid storage tank (DT) for further circulation in the process.

The heated rich capture media in the desorber (D) may be heated to a temperature ranging from 130-150° C. for efficiently desorbing $CO_2$ from the heated rich capture media, to generate hot lean capture media and $CO_2$ gas. A portion of the $CO_2$ generated in the desorber is pressurized for feeding to the desorber (D), as stream (Y), and optionally to the second heat exchanger (Hex-B), as stream (Z), for fluidization of the rich capture media.

The $CO_2$ can be separated from the hot and lean capture media in a second cyclone (C2) and a portion of the separated $CO_2$ is cooled in a fifth heat exchanger (Hex-E) for downstream use.

The thermic fluid is pressurized by means of a pump (P) before feeding to said first heat exchanger (Hex-A).

The hot and lean capture media can be cooled in the third heat exchanger (Hex-C) with the help of a supply of externally provided cold water to obtain cooled lean capture media.

A stream of make-up capture media can be introduced in said cooled lean capture media before entering the adsorber (A).

The present disclosure further provides a single compression system for capturing carbon dioxide ($CO_2$) from a flue gas stream containing $CO_2$; said system comprising:
i. a first blower (B1) adapted to receive the flue gas stream and pressurize said flue gas stream to generate a pressurized flue gas stream with elevated temperature;
ii. a first heat exchanger (Hex-A) adapted to receive said pressurized flue gas stream and thermic fluid and transfer heat from said pressurized flue gas stream to said thermic fluid to obtain heated thermic fluid and a cooled pressurized flue gas stream;
iii. an adsorber (A) adapted to receive said cooled pressurized flue gas stream, fluidized cool and lean capture media and cooled lean capture media emerging from a third heat exchanger (Hex-C), said capture media adapted to adsorb $CO_2$ to generate a rich capture media and a stream of flue gas devoid of $CO_2$;
iv. a second heat exchanger (Hex-B) adapted to receive said rich capture media and heat said rich capture media to near a predefined regeneration temperature, to obtain a heated rich capture media;
v. a desorber (D) adapted to receive said heated rich capture media and further heat said heated rich capture media to desorb $CO_2$ to generate a hot and lean capture media and $CO_2$ gas;
vi. a thermic fluid circulating system adapted to circulate said thermic fluid through said first heat exchanger (Hex-A), said desorber (D) and said second heat exchanger (Hex-B), said thermic fluid circulating system including a thermic fluid storage tank (DT) and a pump (P); and
vii. a third heat exchanger (Hex-C) adapted to cool said hot and lean capture media to generate cooled lean capture media for the adsorption in said adsorber (A).

The system of the present disclosure can further include a first cyclone (C1) adapted to separate said rich capture media and said stream of flue gas devoid of $CO_2$.

The system of the present disclosure can further include a second cyclone (C2) adapted to separate said lean capture media and $CO_2$ gas.

The system of the present disclosure further can include a cold water (C/W) source adapted to supply cold water to said adsorber (A), said third heat exchanger (Hex-C) and said thermic fluid circulating system.

The system of the present disclosure can further include a second blower (B2) adapted to receive $CO_2$ gas from said second cyclone (C2) and supply the pressurized $CO_2$ gas to said desorber (D), as stream (Y), and optionally to said second heat exchanger (Hex-B), as stream (Z).

The thermic fluid circulating system can include a diverter (Dv) adapted to divert a portion of the thermic fluid stream exiting the desorber (D) and going to the thermic fluid storage tank (DT), to flow to the tank via the second heat exchanger (Hex-B).

A make-up capture media stream is introduced in said cooled lean capture media exiting the third heat exchanger (Hex-C) before entering the adsorber (A).

BRIEF DESCRIPTION OF THE ACCOMPANYING DRAWINGS

The disclosure will now be described with reference to the accompanying non-limiting drawing:

FIG. 1 illustrates a schematic diagram of a single compression system (100) for capturing carbon dioxide contained in flue gas using a carbon dioxide capture media.

DETAILED DESCRIPTION

The present disclosure relates generally to the capture of carbon dioxide from a variety of flue gas sources including, without limitation, those from oil refineries, fossil fuel based power plants, cement plants and any other potential source of emissions. The invention of the present disclosure involves a single compression cycle for compressing excess flue gas produced from the afore-stated sources and employs a high temperature heat transfer fluid (thermic fluid) for extracting the heat generated due to the compression, for compensating the heat demand in the step of regeneration of the capture media. Therefore, the invention of the present disclosure primarily includes application of process heat integration with effective harnessing of flue gas heat after compression.

In accordance with the present disclosure, there is provided a system (100) and process for capturing carbon dioxide ($CO_2$) from a flue gas stream containing $CO_2$, in that, the disclosure also provides a process for the regeneration of the carbon dioxide capture media. The system and process will now be explained with reference to FIG. 1; the key components of the system being referenced generally by numerals as indicated in the accompanying drawing.

In accordance with the present disclosure the system (100) comprises the following components:
  a first blower (B1);
  a first heat exchanger (Hex-A);
  an adsorber (A);
  a second heat exchanger (Hex-B);
  a desorber (D); and
  a third heat exchanger (Hex-C).

The process of the present disclosure initially includes directing a hot flue gas stream containing $CO_2$, sourced from an external plant or apparatus, to the first blower (B1). The first blower (B1) receives the flue gas stream, pressurizes it and generates a pressurized flue gas stream with elevated temperature. The pressurized flue gas stream from the first blower (B1) is received by the first heat exchanger (Hex-A) and the first heat exchanger (Hex-A) extracts heat from the pressurized flue gas stream with the help of thermic fluid which is circulated through the heat exchanger (Hex-A); thereby generating a heated thermic fluid and a cooled pressurized flue gas stream. A portion of the cooled pressurized flue gas stream is sent further for treatment in another train of the capture plant. The thermic fluid, originally contained in a thermic fluid storage tank (DT), is pumped by means of a pump (P) before entering the first heat exchanger (Hex-A). Typically, the circulating thermic fluid includes but is not limited to oils, hydrocarbon oils such as Dowtherm and glycols. The adsorber (A) receives another portion of the cooled pressurized flue gas stream and a cool and lean capture media, where the cool and lean capture media adsorbs the $CO_2$ and generates a rich capture media (capture media with adsorbed $CO_2$) along with a stream of flue gas devoid of $CO_2$ (O). The adsorption reaction in the adsorber (A), takes place efficiently at a temperature ranging from 50-70° C. The capture media of the present disclosure is operable under the fluidization mode. The cooled pressurized flue gas stream emerging from the first heat exchanger (Hex-A), on entry in the adsorber (A), fluidizes the capture media. This is done in order to cause maximum adsorption of the $CO_2$ gas on the capture media by preventing it from forming a cake at the bottom of the adsorber (A) and sticking to the reactor wall or polymerizing. The high pressure flue gas causes the capture media to fluidize and to move against gravity which ensures that maximum surface area of the capture media is exposed to the flue gas stream containing $CO_2$. Typically, the capture media includes but is not limited to supported alkali metal carbonate, supported alkali metal oxide and supported amine. The sorption capacity of the capture media ranges between 50 and 200 grams of carbon dioxide per kilogram of the capture media. Further, the capture media of the present disclosure has substantially the same sorption capacity (>99%) after regeneration as the capture media prior to adsorption of carbon dioxide. An external supply of cold water (C/W) is introduced to control the increase in the temperature of the adsorber (A) as the adsorption reaction is exothermic. This increases the reaction kinetics and minimizes the total adsorption time. Due to the drag force of the flue gas flow over the capture media bed, the capture media particles are carried upwards through adsorber (A) to the first cyclone (C1). The stream of flue gas devoid of $CO_2$ (O) and the rich capture media are separated in the first cyclone (C1). The rich capture media emerging from the adsorber (A) after separation from the flue gas stream devoid of $CO_2$ can be recycled, as stream (O'), via the first cyclone (C1) to the adsorber (A). The stream of flue gas devoid of $CO_2$(O) is sent to the stack for further treatment and is vented to the atmosphere; whereas the second heat exchanger (Hex-B) receives the rich capture media and heats the rich capture media to near a predefined regeneration temperature, to obtain a heated rich capture media. The second heat exchanger (Hex-B) reduces the thermal load on the desorber (D) which is used downstream. The heating in the second heat exchanger (Hex-B) is brought about by utilizing sensible enthalpy of circulating thermic fluid. A heated rich capture media stream and a warm thermic fluid stream are found to emerge from the second heat exchanger (Hex-B). The warm thermic fluid stream is cooled a fourth heat exchanger (Hex-D) before storing in the afore-mentioned thermic fluid storage tank (DT) for further circulation in the process.

The heated rich capture media emerging from the second heat exchanger is then fed into a desorber (D) where it is heated by the circulating heated thermic fluid emerging from the first heat exchanger (Hex-A) to cause $CO_2$ desorption (rich capture media regeneration). The heated rich capture media in the desorber (D) may be heated to a temperature ranging from 130-150° C. for efficiently desorbing $CO_2$ from the heated rich capture media. The necessary thermal energy for regeneration is provided by the essential sensible enthalpy derived by the thermic fluid from the flue gas stream containing $CO_2$. Although any reactor which can circulate catalyst continuously may be employed for the adsorption and desorption processes, circulating interconnected fluidized bed reactors are used as they (i) facilitate uniform temperature distribution due to rapid mixing and hence, energy efficient due to exchange of heat with the circulating sorbent; (ii) reduce the effect of gas bypassing and hence, cause high heat and mass transfer rates between gas and particles; (iii) avoid hot spots generation during exothermic absorption reaction; (iv) offer high superficial velocity to reduce the reactor size. Typically, the adsorber (A) and the desorber (D) are interconnected circulating fluidized bed reactors operating in regime that include but are not limited to dense, bubbling, entrained, turbulent, fast fluidization. The step of heating causes the $CO_2$ from the heated rich capture media to be desorbed; thereby generating a mixture of hot and lean capture media and $CO_2$ gas. The $CO_2$ gas is separated from the hot and lean capture media in a second cyclone (C2) and a portion of the separated $CO_2$ is cooled in a fifth heat exchanger (Hex-E) for downstream use. Another portion of the $CO_2$ gas stream is used for the fluidization of the heated rich capture media in the desorber (D). In one embodiment, the other portion of the $CO_2$ gas stream is initially pressurized in a second blower (B2), as stream (Y), before feeding to the desorber (D) and optionally to the second heat exchanger (Hex-B), as stream (Z), for fluidization.

The separated hot and lean capture media is directed to a third heat exchanger (Hex-C) for cooling before directing the resultant cooled lean capture media to the adsorber (A) for reiteration of the process. The step of cooling is carried out by means of a supply of externally provided cold water (C/W). A stream of make-up capture media is introduced in the cooled lean capture media before entering the adsorber (A).

The system of the present disclosure includes a thermic fluid circulating system. The thermic fluid circulating system circulates the thermic fluid through the first heat exchanger (Hex-A), the desorber (D) and the second heat exchanger (Hex-B) and functions to regulate the temperature and enthalpy of the entire system (100). The thermic fluid circulating system also includes a diverter (Dv) which diverts a portion of the thermic fluid stream exiting the desorber (D) and going to the thermic fluid storage tank (DT), to flow to the tank via the second heat exchanger (Hex-B).

In an optional embodiment of the process of the present disclosure, a portion of the cooled pressurized flue gas stream (X), emerging from the first heat exchanger (Hex-A), is used for fluidizing the separated capture media in the third heat exchanger (Hex-C).

The process of the present disclosure offers significant advantages as compared to the conventional amine based absorption process, for all key performance parameters. The total heat required for regeneration of the capture media in the conventional amine based absorption process is higher than that required in the process of the present disclosure. The flue gas cooler in present invention recovers maximum heat associated with the flue gas stream to utilize within the process. On the other hand, most of the heat is lost during the cooling in the conventional amine process. In any capture process, the steam requirement significantly influences the operating cost associated with the regeneration of the capture media, but the present invention judiciously tackles the problem of heat demand for the regeneration step by utilizing the heat available with flue gas stream, which is an insignificant value as compared to the generation of steam. Similarly, the quantity of cooling water required in the present disclosure is appreciably lower than that required in the conventional amine based process.

The present disclosure will now be discussed in the light of the following non-limiting embodiments:

Example 1: The Process of Capture of $CO_2$ According to the Present Disclosure and its Comparison with the Conventional Absorption Process A] the Process of Capture of $CO_2$ According to the Present Disclosure:

A stream of 315 (tonnes per hour) TPH of flue gas [carbon dioxide: 16, oxygen: 2 and nitrogen: rest, composition on the dry basis (vol %)] at 160° C. temperature and 1 bar pressure was introduced into a first blower (7.9 MW) to obtain flue gas stream at 243° C. temperature and 1.65 bar pressure. The pressurized flue gas stream was forwarded into a first heat exchanger where the heat from the pressurized stream was extracted by 180.9 TPH of Dowtherm, as circulating thermic fluid that was made to pass through the first heat exchanger. The thermic fluid at 40° C., originally contained in a thermic fluid storage tank, was pumped (10 bar) before entering the first heat exchanger. After the extraction of heat, a 315 TPH cooled pressurized flue gas stream at 55° C. temperature and 1.5 bar pressure and a 180.9 TPH heated thermic fluid stream at 232.35° C. were obtained.

A portion of the cooled pressurized flue gas stream was diverted into a $CO_2$ adsorber, where fluidized cool and lean capture media-potassium carbonate supported on alumina was also introduced. The fluidized cool and lean capture media adsorbed the $CO_2$ present in the flue gas stream to generate a 52.5 TPH treated flue gas stream free of $CO_2$ at 70° C., which was exhausted to the stack after separation in a first cyclone. A 132.5 TPH capture media rich with adsorbed $CO_2$ at 70° C., was also obtained. The temperature of the adsorber was controlled with the help of 358 TPH of external cold water at 30° C. that was made to circulate through the reactor. The rich capture media that emerged from the adsorber was separated in the first cyclone and recycled back to the adsorber.

The 132.5 TPH of rich capture media at 70° C. was moved to a second heat exchanger where the rich capture media was heated to near a regeneration temperature of about 130° C., at least partially, using the 91.15 TPH heated thermic fluid at 130° C. A 132.5 TPH heated rich capture media stream at 120° C. and a warm thermic fluid stream were found to emerge from the second heat exchanger. The warm thermic fluid stream was cooled by using 241 TPH of cold water at 30° C. before storing in the afore-mentioned thermic fluid storage tank for further circulation in the process.

The 132.5 TPH of heated rich capture media at 120° C. emerging from the second heat exchanger was then fed into a desorber where it was heated by 180.9 TPH of the circulating heated thermic fluid at 232.35° C. emerging from the first heat exchanger. The step of heating caused the $CO_2$ from the heated rich capture media to be desorbed; thereby generating a mixture of 120 TPH of the hot and lean capture media at 130° C. and 12.5 TPH $CO_2$ gas. The $CO_2$ gas was separated from the hot and lean capture media in a second cyclone and a portion of the separated $CO_2$ was cooled using 12.6 TPH of cold water at 30° C. for downstream use. Another portion of the $CO_2$ gas stream was used for the fluidization of the heated rich capture media in the desorber. In one embodiment, the other portion of the $CO_2$ gas stream was initially pressurized in a blower at 1.5 bar before feeding to the desorber and to the second heat exchanger for fluidization.

The separated hot and lean capture media was directed to a third heat exchanger for cooling using 126 TPH of cold water at 30° C. before directing the resultant 120 TPH of cooled lean capture media at 55° C. to the adsorber for reiteration of the process. A make-up capture media stream was also introduced in the cooled lean capture media before entering the adsorber.

B] Comparison of the Process of the Present Disclosure with the Conventional Absorption Process:

$CO_2$ capture achieved by the conventional amine based absorption process and the process of the present disclosure has been provided in Table 1 that illustrates the efficacy of the process of the present disclosure vis-à-vis the conventional amine based absorption process, on the basis per tonnes of carbon dioxide.

TABLE 1

Comparison of the process of the present disclosure with the conventional absorption process

| Key Performance Parameters (Basis: per ton of carbon dioxide capture) | Conventional abs. Process | Present process |
| --- | --- | --- |
| Temp. (° C.) window for flue gas stream from refinery/power plant | 160-250 | 160-250 |
| Excess flue gas (x required quantity) | NA | 2.5-4.5 |
| Flue gas blower pressure window (bar) | 1.5-2.0 | 1.5-1.75 |
| Temp. window of pressurized flue gas for sorption (° C.) | 30-40 | 50-65 |
| Temp. window of solvent/sorbent regeneration (° C.) | 105-120 | 130-150 |
| Total energy requirement (GJ) | 3.0-4.2 | 0.85-2.5 |
| External steam for regeneration @ 4 Bar (ton) | 2.0-3.5 | 0.0 |
| Cooling water (m³) | 70-105 | 50-60 |
| Electricity power (MW) | 1.75-2.0 | 3.0-8.0 |
| Operating cost | B[b] | (0.3-0.6) × B |

NA: not applicable
[a]heat is lost in flue gas cooler to attain absorption temperature
[b]Baseline cost = B The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Technical Advantages and Economic Significance

The process and system of the present disclosure harness the heat associated with the flue gas and utilize it to replenish the heat requirement within the process; thereby increasing the cost-efficiency and environment friendly value of the process.

The process and system of the present disclosure employ a single-compression cycle for pressurizing the flue gas for adsorption based carbon dioxide capture from the flue gas stream.

The invention of the present disclosure also provides a heat integrated process that significantly reduces the operating cost by using a single-compression cycle for regeneration of the capture media used for carbon dioxide capture from flue gas stream.

The flue gas generated from any source outside the battery limit can be delivered to system of the present disclosure in a conventional manner. The process and system of the present disclosure can, therefore, be easily retrofitted to existing facilities.

Further, use of fluidized bed reactors (adsorber and desorber) with circulating capture media enables efficient control over the capture media temperature and avoidance of any disadvantages due to fixed bed configuration.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

The numerical values given for various physical parameters, dimensions and quantities are only approximate values and it is envisaged that the values higher than the numerical value assigned to the physical parameters, dimensions and quantities fall within the scope of the invention and the claims unless there is a statement in the specification to the contrary.

While certain embodiments of the inventions have been described, these embodiments have been presented by way of example only, and are not intended to limit the scope of the inventions. Variations or modifications in the process or compound or formulation or combination of this invention, within the scope of the invention, may occur to those skilled in the art upon reviewing the disclosure herein. Such variations or modifications are well within the spirit of this invention. The accompanying claims and their equivalents are intended to cover such forms or modifications as would fall within the scope and spirit of the invention.

The invention claimed is:

1. A single compression process for capturing carbon dioxide ($CO_2$) from a flue gas stream containing $CO_2$; said process comprising the following steps:
   i. directing the flow of the flue gas stream through a first blower to obtain a pressurized flue gas stream with elevated temperature;
   ii. extracting the heat from the pressurized flue gas stream in a first heat exchanger using circulating thermic fluid to obtain a heated thermic fluid and a cooled pressurized flue gas stream;
   iii. directing the cooled pressurized flue gas stream to a $CO_2$ adsorber;
   iv. passing in the adsorber a fluidized lean $CO_2$ capture media to generate a stream comprising rich capture media and flue gas devoid of $CO_2$;
   v. separating in a first cyclone said rich capture media and said stream of flue gas devoid of $CO_2$;
   vi. directing the separated stream of flue gas devoid of $CO_2$ to a stack for further treatment;

vii. leading said separated rich capture media to a second heat exchanger where it is heated to near regeneration temperature, at least partially, using said heated thermic fluid to obtain a heated rich capture media;

viii. feeding said heated rich capture media to a desorber;

ix. heating the heated rich capture media in the desorber by circulating said heated thermic fluid to desorb $CO_2$ from the heated rich capture media to generate a mixture of hot lean capture media and $CO_2$ gas;

x. separating $CO_2$ gas from the hot lean capture media; and xi. cooling the separated hot and lean capture media in a third heat exchanger for adsorption in the adsorber for reiteration of the process to provide cooled lean capture media.

2. The process as claimed in claim 1, wherein a portion of the cooled pressurized flue gas stream is used for fluidizing said separated capture media in the third heat exchanger.

3. The process as claimed in claim 1, wherein the temperature of the adsorber is controlled with the help of external cold water circulating through the adsorber during the process of adsorption of the $CO_2$ on the cool and lean capture media.

4. The process as claimed in claim 1, wherein said capture media is at least one selected from the group consisting of supported alkali metal carbonate, supported alkali metal oxide and supported amine.

5. The process as claimed in claim 1, wherein the rich capture media emerging from the adsorber after separation from the flue gas stream devoid of $CO_2$ is recycled via the first cyclone to the adsorber.

6. The process as claimed in claim 1, wherein, in the second heat exchanger, said rich capture media is heated by a circulating thermic fluid leaving the desorber to obtain a warm thermic fluid leaving the second heat exchanger.

7. The process as claimed in claim 1, wherein said adsorber and said desorber are circulating interconnected fluidized bed reactors operating in at least one regime selected from the group consisting of dense, bubbling, entrained, turbulent and fast fluidization.

8. The process as claimed in claim 1, wherein the warm thermic fluid leaving the second heat exchanger is cooled before storing in a thermic fluid storage tank for further circulation in the process.

9. The process as claimed in claim 1, wherein a portion of the $CO_2$ generated in the desorber is pressurized for feeding to the desorber, as stream, and optionally to the second heat exchanger as stream, for fluidization of the rich capture media.

10. The process as claimed in claim 1, wherein the $CO_2$ is separated from the hot and lean capture media in a second cyclone and a portion of the separated $CO_2$ is cooled in the fifth heat exchanger for downstream use.

11. The process as claimed in claim 1, wherein the thermic fluid is pressurized by means of a pump before feeding to said first heat exchanger.

12. The process as claimed in claim 1, wherein the hot and lean capture media is cooled in the third heat exchanger with the help of a supply of externally provided cold water to obtain cooled lean capture media.

13. The process as claimed in claim 1, wherein a stream of make-up capture media is introduced in said cooled lean capture media before entering the adsorber.

14. A single compression system for capturing carbon dioxide ($CO_2$) from a flue gas stream containing $CO_2$; said system comprising:

i. a first blower adapted to receive the flue gas stream and pressurize said flue gas stream to generate a pressurized flue gas stream with elevated temperature;

ii. a first heat exchanger adapted to receive said pressurized flue gas stream and thermic fluid and transfer heat from said pressurized flue gas stream to said thermic fluid to obtain heated thermic fluid and a cooled pressurized flue gas stream;

iii. an adsorber adapted to receive said cooled pressurized flue gas stream, fluidized cool and lean capture media and cooled lean capture media emerging from a third heat exchanger, said capture media adapted to adsorb $CO_2$ to generate a rich capture media and a stream of flue gas devoid of $CO_2$;

iv. a second heat exchanger adapted to receive said rich capture media and heat said rich capture media to near a predefined regeneration temperature, to obtain a heated rich capture media;

v. a desorber adapted to receive said heated rich capture media and further heat said heated rich capture media to desorb $CO_2$ to generate a hot and lean capture media and $CO_2$ gas;

vi. a thermic fluid circulating system adapted to circulate said thermic fluid through said first heat exchanger, said desorber and said second heat exchanger, said thermic fluid circulating system including a thermic fluid storage tank and a pump; and vii. a third heat exchanger adapted to cool said hot and lean capture media to generate cooled lean capture media for the adsorption in said adsorber.

15. The system as claimed in claim 14, wherein said capture media is at least one selected from the group consisting of supported alkali metal carbonate, supported alkali metal oxide and supported amine.

16. The system as claimed in claim 14, wherein said adsorber and said desorber are circulating interconnected fluidized bed reactors operating in at least one regime selected from the group consisting of dense, bubbling, entrained, turbulent and fast fluidization.

17. The system as claimed in claim 14, which further includes a first cyclone adapted to separate said rich capture media and said stream of flue gas devoid of $CO_2$; a second cyclone adapted to separate said lean capture media and $CO_2$ gas; and a second blower adapted to receive $CO_2$ gas from said second cyclone and supply the pressurized $CO_2$ gas to said desorber, as stream, and optionally to said second heat exchanger, as stream.

18. The system as claimed in claim 14, which further includes a cold water source adapted to supply cold water to said adsorber, said third heat exchanger and said thermic fluid circulating system.

19. The system as claimed in claim 14, wherein said thermic fluid circulating system includes a diverter adapted to divert a portion of the thermic fluid stream exiting the desorber and going to the thermic fluid storage tank, to flow to the tank via the second heat exchanger.

20. The system as claimed in claim 14, wherein a make-up capture media stream is introduced in said cooled lean capture media exiting the third heat exchanger before entering the adsorber.

* * * * *